United States Patent
Valencia

(10) Patent No.: US 6,487,598 B1
(45) Date of Patent: *Nov. 26, 2002

(54) VIRTUAL DIAL-UP PROTOCOL FOR NETWORK COMMUNICATION

(75) Inventor: Andrew J. Valencia, Vashon, WA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/903,796

(22) Filed: Jul. 11, 2001

Related U.S. Application Data

(63) Continuation of application No. 09/309,166, filed on May 10, 1999, now Pat. No. 6,308,213, which is a continuation of application No. 08/687,973, filed on Jul. 29, 1996, now Pat. No. 5,918,019.
(60) Provisional application No. 60/034,508, filed on Dec. 27, 1996.

(51) Int. Cl.[7] .............................................. G06F 15/16
(52) U.S. Cl. ........................ 709/227; 709/201; 709/229; 709/230; 713/201; 713/151; 713/152; 370/401; 370/469
(58) Field of Search ................................ 709/200–203, 709/217–219, 227–230, 236–238; 713/151–153, 155, 166, 171–172, 200–201; 370/401, 464

(56) References Cited

U.S. PATENT DOCUMENTS

| | | | |
|---|---|---|---|
| 4,644,532 A | | 2/1987 | George et al. ............... 370/255 |
| 5,014,265 A | | 5/1991 | Hahne et al. |
| 5,159,592 A | * | 10/1992 | Perkins ........................ 370/338 |
| 5,371,852 A | | 12/1994 | Attanasio et al. |
| 5,416,842 A | * | 5/1995 | Aziz ............................ 380/30 |
| 5,437,013 A | * | 7/1995 | Rubin ......................... 709/230 |
| 5,602,918 A | * | 2/1997 | Chen et al. ................... 380/21 |
| 5,604,803 A | * | 2/1997 | Aziz ............................ 380/25 |
| 5,623,605 A | * | 4/1997 | Keshav et al. ......... 395/200.66 |
| 5,642,515 A | * | 6/1997 | Jones et al. .................. 395/727 |
| 5,689,566 A | * | 11/1997 | Nguyen ........................ 380/25 |
| 5,715,399 A | * | 2/1998 | Bezos ......................... 235/379 |
| 5,802,290 A | * | 9/1998 | Casselman ................... 709/201 |
| 5,918,019 A | * | 6/1999 | Valencia ..................... 709/227 |
| 6,308,213 B1 | * | 10/2001 | Valencia ..................... 709/229 |

OTHER PUBLICATIONS

D. Mathieson, C. Kalbfleisch, S. Hunt and K. Low, "High Spees Serial Communications for Control Systems," IEEE, pp. 1826–1828, 1993.*
Kevin Fogarty and Tim Greene, "Microsoft tunnels through the 'Net with new protocol." (No Date).
Article authored by Kevin Fogarty and Tim Greene entitled "Microsoft tunnels through the 'Net with new protocol."

* cited by examiner

*Primary Examiner*—Bharat Barot
(74) *Attorney, Agent, or Firm*—Marger Johnson & McCollom, PC

(57) ABSTRACT

A layer two forwarding protocol (L2F) provides virtual direct dial-up service into private networks through public internet service providers. An authorized remote client appears as a direct dial-up client to the home gateway, even through the client is accessing the home gateway remotely through the ISP. The new forwarding protocol allows the remote client to conduct point-to-point link protocols, such as point-to-point protocol (PPP) and serial line interface protocol (SLIP) directly with the local network home gateway. The network access server changes from a routing mode where a communication protocol is conducted with the client to a switching mode where the POP simply sends data from one port to a tunnel. The tunnel then transmits the data to another port, regardless of the header information on transmitted data packets. The remote client can then be managed through databases controlled by the local network and gain access to resources not typically accessible through the internet. The layer two forwarding protocol conducts an independent authorization session to prevent unauthorized access to the private network and provides point-to-point protocol transport over the internet independently of internet transport protocols.

50 Claims, 7 Drawing Sheets

VIRTUAL DIAL-UP PROTOCOL FOR NETWORK COMMUNICATION

BACKGROUND OF THE INVENTION

This application is a continuation of U.S. patent application Ser. No. 09/309,166, filed May 10, 1999, now U.S. Pat. No. 6,308,213, issued Oct. 23, 2001 which claims the benefit of U.S. patent application Ser. No. 08/687,973 filed Jul. 29, 1996, now U.S. Pat. No. 5,918,019, issued Jun. 29, 1999 which claims benefit of provisional application 60/034,508 filed Dec. 27, 1996.

This invention relates generally to network systems and more particularly to a virtual dial-up system used for accessing a private local network through an internet access service.

FIG. 1 is a prior art internetwork system 12 which includes multiple dial-up network access servers (NAS) 14 also referred to as points of presence (POPs). The POPs 14 can be located at different geographical locations around the world. An internet service provider (ISP) operates multiple POPs 14 through a backbone network 16. The ISP network 16 is connected to an internet infrastructure, referred to generally as internet 18. Different clients 26 dial into a POP 14 in order to access the internet through the ISP network 16.

Local Area Networks (LANs) 22 are typically operated by private companies and include multiple local clients 26. The LAN 22 is connected to internet 18 through a home gateway 20. The home gateway 20 includes a firewall 28 that prevents unauthorized external access into the private network 22 through internet 18. While some access is possible from outside the firewall (e.g., electronic mail), resources such as network databases and application programs are only accessible by clients located behind the firewall 28.

An authorized client may need to access files and other resources on network 22 from remote locations, such as when working at home or while on sales trips. Privately operated POPs 24 provide the remote clients with a direct dial-up capability to network 22. Since the POP 24 is located behind firewall 28, a remote client can dial into POP 24 and gain full access to resources on network 22.

In many instances, it is more cost effective for companies to outsource dial-up service to general internet service providers, such as ISP 16. However, the firewall 28 in home gateway 20 denies access to remote clients that attempt to access LAN 22 through a general internet service provider.

Different network protocols may be used within the internet infrastructure and within the private network 22. For example, an Internet Protocol (IP) is typically used at the network protocol level to send information through the internet 18. However, private networks 22 may use any one of a variety of network protocols including IP, IPX, Appletalk, etc. When a remote client dials into a POP 14, the ISP dynamically assigns an IP address to the remote client 26. Thus, the remote client may be denied access by home gateway 20 because the IP address assigned by the ISP network 16 is not one of the authorized addresses in the LAN 22. The remote client may also be forced by the ISP to use an IP protocol incompatible with the local network 22. Because the IP protocol and the local LAN protocol are incompatible, the remote client is prevented from accessing resources on LAN 22.

Accordingly, a need remains for remote client access to private networks through internet service providers while maintaining security from unauthorized internet users.

SUMMARY OF THE INVENTION

A layer two forwarding protocol (L2F) is integrated with existing network protocols to provide a virtual direct dial-up service into private networks from internet service providers. A remote client accesses an ISP network access server (NAS). The NAS determines whether the remote client is requesting virtual dial-up service to a local network or standard dial-up service. If virtual dial-up service is requested, a tunnel connection is established from the NAS to a home gateway for the local network. If the home gateway acknowledges the remote client as an authorized network user, a direct dial-up session is established between the NAS and the home gateway.

The L2F allows the remote client to negotiate with the home gateway using a point-to-point link level protocol such as point-to-point protocol (PPP). The remote client can then be managed through databases controlled by the local network and gain access to resources not typically accessible through the internet. Thus, the remote client appears as a direct dial-up client to the home gateway, even through the client is accessing the home gateway remotely through the ISP.

A PPP user uses various link level protocols such as link control protocol (LCP) and network control protocol (NCP) to initially negotiate bidirectionally between the remote client and the NAS. PPP negotiates physical parameters between the remote client and the POP. For PPP, an authentication protocol such as a challenge and authorization protocol (CHAP) or a password authentication protocol (PAP) is used to verify the remote client identity. During the authentication process, the remote client encrypts a random number based on a remote client password which cannot be authenticated by the NAS. Thus, if the remote client dials up to the wrong location and the client responds, the dial-up server will not receive any password information that can be used for unauthorized access to the local network.

The NAS looks at the remote client name to determine a communication destination and requirements for establishing a tunnel connection with the home gateway. The NAS uses L2F to authenticate the remote client with the home gateway. The home gateway looks through a local database for the client name and an associated client password. The private system then independently encrypts a random number transmitted from the NAS according to the client password. If the random number encrypted by the home gateway matches the random number encrypted by the remote client, a tunnel connection is established between the NAS and the home gateway.

If the tunnel connection is established, the NAS is essentially converted from a PPP endpoint into a switch. In other words, the NAS changes from a routing mode where a communication protocol is conducted with the client to a switching mode where the POP simply sends data from one port to a tunnel. The tunnel then transmits the data to another port, regardless of the header information on transmitted data packets.

L2F tunnels at the link level frames (i.e., HDLC and async HDLC) of higher level protocols. By using tunnels, it is possible to divorce the location of the initial dial-up server from the location where the dial-up protocol connection is terminated and access to the network is provided. The PPP session can then be projected from the NAS to the home gateway appearing to the home gateway as a direct dial-up session. LCP occurs between the client and the NAS for establishing subsequent protocols used between the remote client and the local LAN. For example, an IP control protocol (IPCP) can be negotiated to establish communication between the internet and an Appletalk protocol (ATPT).

L2F provides the ability to multiplex multiple clients within a tunnel and allows the home gateway to tell different tunnels apart. From a L2F header, the home gateway determines what NAS and client the data is coming from and accordingly connects the client to the correct virtual interface. The tunneling technique used in conjunction with L2F does not require authentication or address assignment from the ISP. Thus, termination protocols and updating requirements normally performed by the ISP, and which are incompatible with private networks such as IPX and Appletalk, are not necessary.

L2F allows multiple protocols and unregistered IP addresses to be used across existing internet infrastructure. Thus, very large investments in access and core infrastructure can be shared.

The foregoing and other objects, features and advantages of the invention will become more readily apparent from the following detailed description of a preferred embodiment of the invention which proceeds with reference to the accompanying drawings.

DETAILED DESCRIPTION

Figure 2:
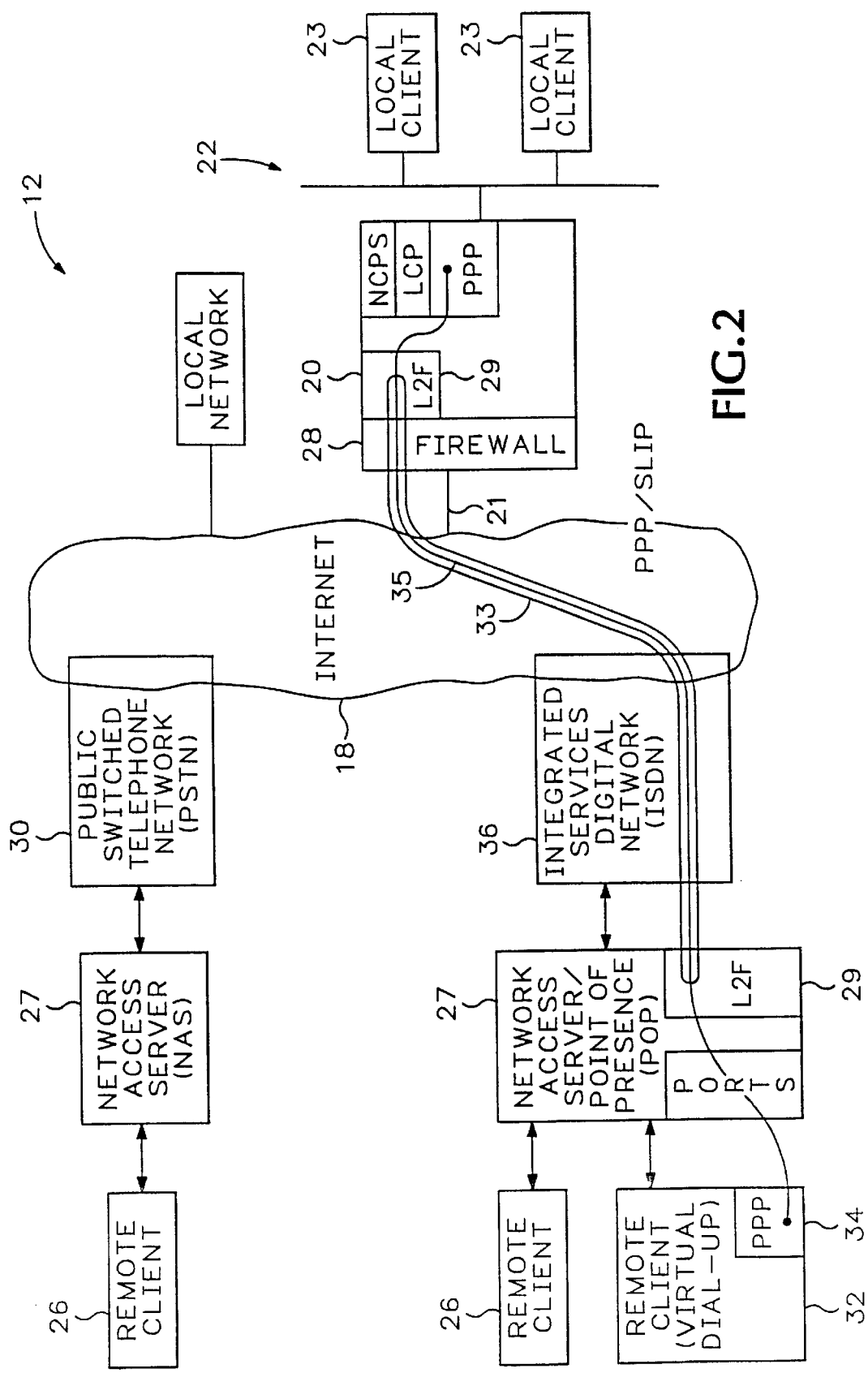
FIG. 2 is a diagram showing a virtual dial-up session according to the invention.

Referring to FIG. 2, remote client 26 is coupled to an Internet Service Provider (ISP) network access server (NAS) 27 that accesses the internet infrastructure 18 via a Public Switched Telephone Network (PSTN) 30 (i.e., async PPP via modems). Remote client 32 is coupled to a NAS 27 through a port and accesses the internet 18 via an Integrated Services Digital Network (ISDN) 32 (i.e., synchronous PPP access). A private Local Area Network (LAN) 22 includes local clients 23 and is connected to internet 18 through a home gateway 20 which includes a firewall 28. NAS 27 is alternatively defined as an ISP Point of Presence (POP).

The hardware and software required to generally operate NAS 27, PSTN 30, ISDN 32, internet infrastructure 18, home gateway 20, firewall 28 and local clients 26 and remote clients 26 and 32 are all well known to those skilled in the art and are, therefore, not described in detail.

Figure 1:
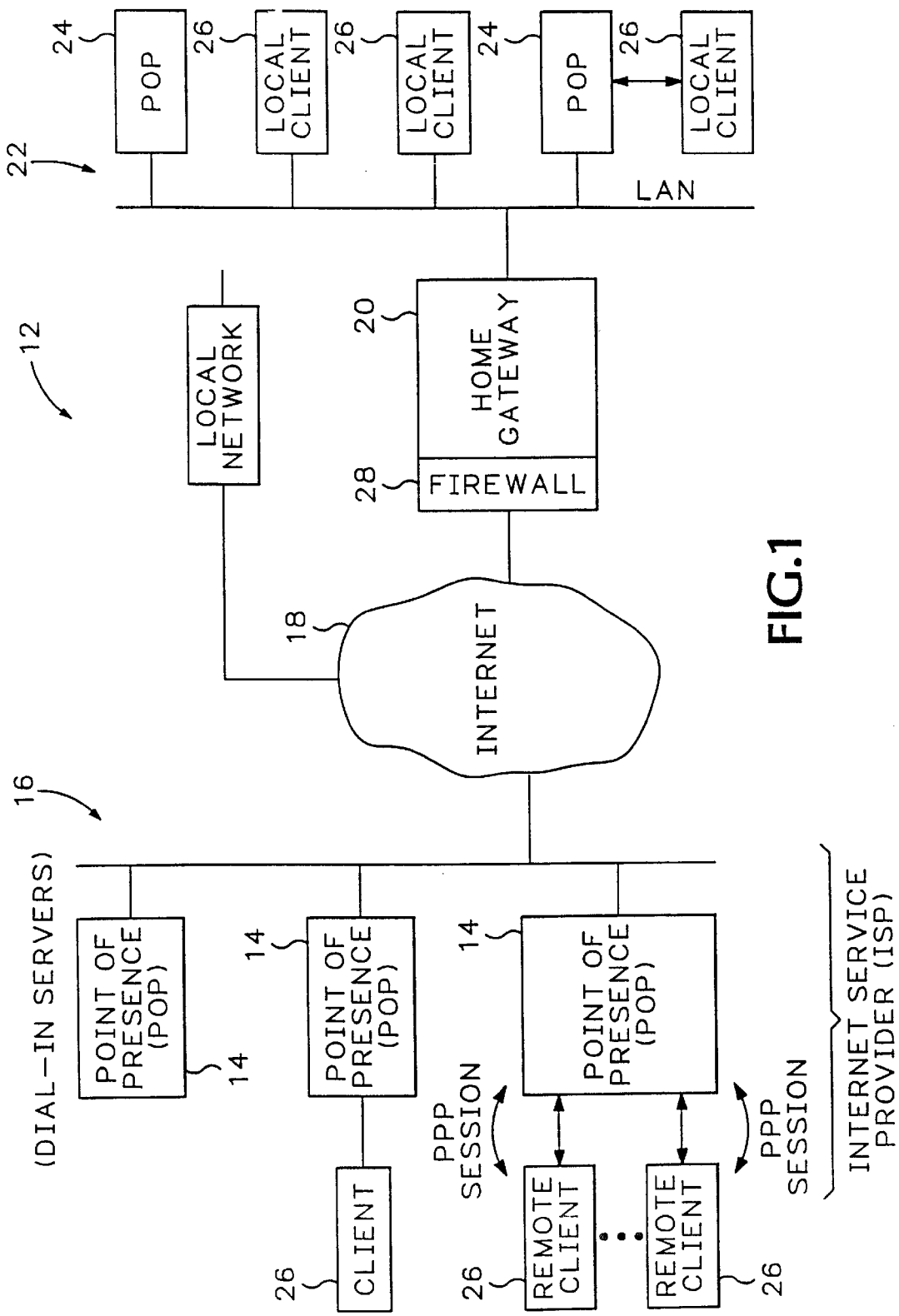
FIG. 1 is a prior art diagram of an internet system.

Remote client 32 accesses LAN 22 through a virtual dial-up session according to the invention. During the virtual dial-up session, the remote client 32 appears as a direct dial-up client to home gateway 20. Thus, remote client 32 can access any of the resources, such as local clients 23, on LAN 22 through the internet service provider NAS 27. Since the remote client 32 can access resources from NAS 27, the company operating LAN 22 is not required to purchase and maintain private POPs 24 (FIG. 1). Because remote client 32 can utilize a local NAS, long distance calls do not have to be made to a dial-up server located at LAN 22.

The virtual dial-up session uses the L2F protocol to project a point-to-point link level session (e.g., PPP/SLIP 34) from the NAS 27 to home gateway 20 (e.g., PPP/SLIP) 35. The PPP/SLIP session 34 is encapsulated in L2F 29 and then transmitted from NAS 27, through internet 18, to home gateway 20. The home gateway uses the L2F protocol 29 to verify that remote client 32 is an authorized user for LAN 22 and to establish a tunnel 33 between NAS 27 and home gateway 20. After verification and tunnel establishment, L2F 29 is used to conduct a direct link level session, such as LCP, between remote client 32 and home gateway 20.

Figure 3:
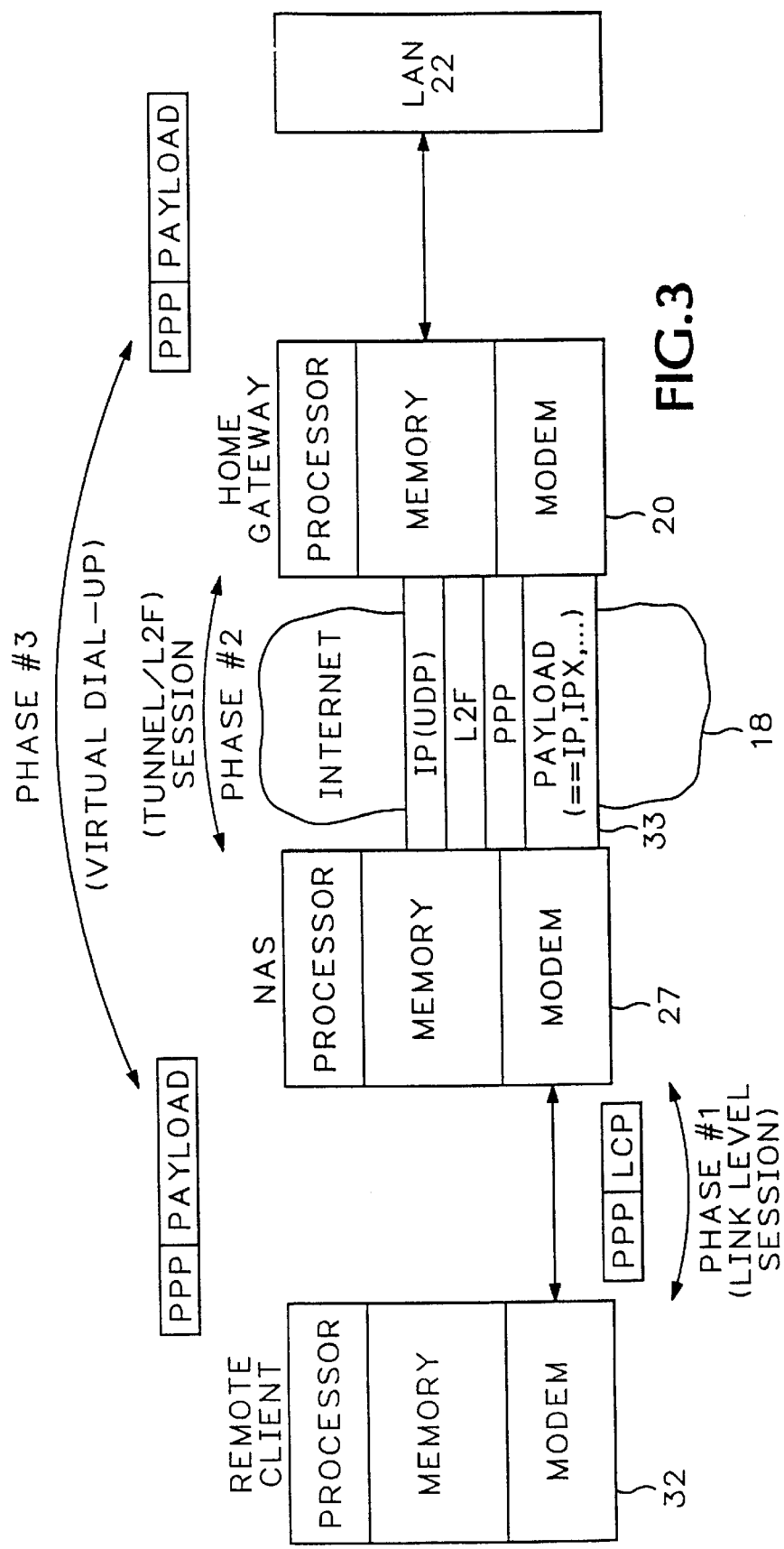
FIG. 3 is a diagram showing different phases of the virtual dial-up session.

Referring to FIG. 3, the remote client 32 in one embodiment, comprises a personal computer having a processor, memory and a modem. The remote client 32 initially dials up a local telephone number for dialing into NAS 27. NAS 27 includes a processor, memory and a modem for receiving and processing data transmitted from the remote client 32. In order to establish communications over the point-to-point link between remote client 32 and NAS 27, each end of the PPP link must first send LCP packets to configure and test the data link.

The NAS 27 uses a modem or a router (not shown) to connect into internet 18. Software in NAS 27 encapsulates the PPP session in L2F. Using existing protocols, such User Datagram Protocol (UDP) and Internet Protocol (IP), NAS 27 creates the tunnel 33 through the internet 18 that carries the L2F packet to gateway 20. The home gateway 20 includes a processor, memory and a modem that connects to internet 18. A two step authentication protocol is then conducted. The NAS 27 and the home gateway 20 first perform a bidirectional authentication and then the remote client 32 authenticates. If the remote client 32 is authenticated as an authorized client for LAN 22, a tunnel connection is made between NAS 27 and home gateway 20 and the virtual dial-up session is established. The L2F encapsulated PPP packet is then tunneled from NAS 27 to home gateway 20.

Remote client 32 and home gateway 20 are then free to negotiate NCPs for each protocol. After the PPP session between remote client 32 and home gateway 20 is established via tunnel 33, remote client 32 is free to access resources in LAN 22 without restrictions from the firewall 28 in home gateway 20 (FIG. 2) or from incompatible network protocols.

Remote Client/NAS Point-to-Point Protocol Session

Figure 4:
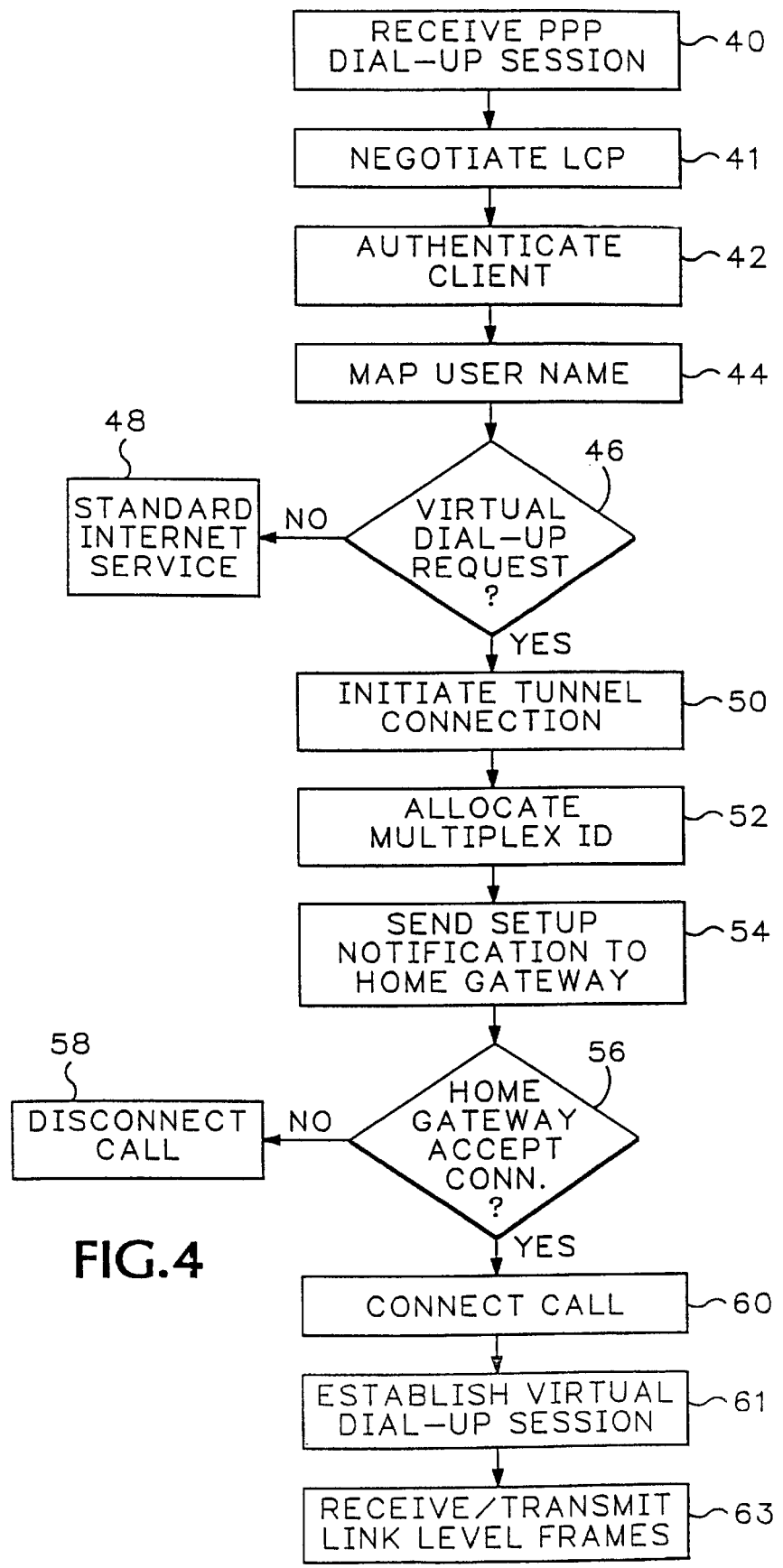
FIG. 4 is a step diagram showing steps performed by the network access server when establishing a virtual dial-up session.

FIG. 4 is a step diagram describing the initial dial-up session between remote client 32 and NAS 27. The remote client 32 initiates a PPP connection 34 (FIG. 2) to NAS 27 in step 40. The NAS 27 accepts the connection and the PPP link is established. LCP is negotiated in step 41.

The NAS 27 authenticates the client 32 using an authentication protocol such as CHAP in step 42. The NAS 27 pursues authentication to the extent required to discover the remote client's apparent identity, and by implication, the desired home gateway 20. Point-to-point protocols such as PPP/SLIP and authentication protocols, such as CHAP, are well-known to those skilled in the art and are, therefore, not explained in detail.

A username field is interpreted by NAS 27 in step 44 to determine whether virtual dial-up service is required. The username is either structured (e.g., bill@localnet.com) or the NAS 27 maintains a database mapping users to services. In the case of virtual dial-up, the mapping will name a specific endpoint, the home gateway 20. If a virtual dial-up service is not required, standard access to the internet 18 is provided in step 48.

When step 46 determines a virtual dial-up is requested (i.e., the apparent remote client identity is determined), step 50 initiates a tunnel connection to the home gateway 20 using the authentication information gathered by the NAS 27 in step 42. If a tunnel 33 is already initiated between the NAS 27 and home gateway 20, a slot in the tunnel 33 is allocated for the remote client 32. Tunneling is provided by an existing protocol such as (UDP), Frame Relay permanent virtual connections (PVCs), or X.25 virtual connections described in detail in the following request for comments (RFCs) UDP=RFC 768, IP=RFC 791, Frame Relay=RFC 1490.

Once the tunnel 33 exists, an unused multiplex ID (MID) is allocated, in step 52 and a set-up notification packet (see FIG. 5) is sent to notify the home gateway 20 of the new dial-up session. The NAS 27 waits for the home gateway 20 either to accept or reject the set-up notification in step 56. Rejection can include a reason indication, which is displayed to the remote client 32. After the rejection is displayed, the call from NAS 27 to home gateway 20 is disconnected in step 58. If the set-up notification is accepted, step 60 connects the call and step 61 establishes the virtual dial-up session in step 61. Link level frames are then received and transmitted between the two endpoints in step 63.

Figure 5:
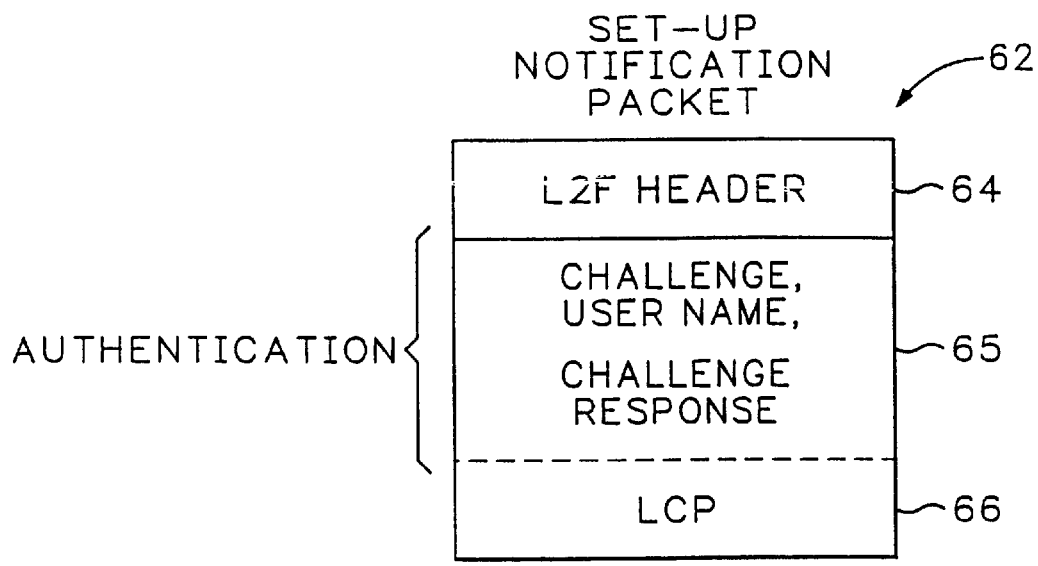
FIG. 5 is a diagram showing a data structure for a layer two forwarding protocol set-up notification packet.

Referring to FIG. 5, a set-up notification packet 62 includes a L2F header 64, authentication data 64 and LCP data 66. The packet 62 is used by the home gateway 20 to authenticate the remote client and to decide whether to accept or decline the tunnel connection. In the case of CHAP, the set-up notification packet authentication data includes a random number challenge, username and password. For PAP or text dialog (i.e., for SLIP users), the authentication information 64 includes username and clear text password. The home gateway 20 can use this information to complete remote client authentication, avoiding an additional cycle of authentication.

To initiate a PPP session between the remote client 32 and the home gateway 20, the set-up notification packet 62 includes a copy of LCP parameters 66 for the completed LCP negotiation between remote client 32 and NAS 27 (FIG. 3). The home gateway 20 may use this information to initialize its own PPP state avoiding additional LCP negotiation. The home gateway 20 may alternatively choose to initiate a new LCP exchange with remote client 32.

Figure 6:
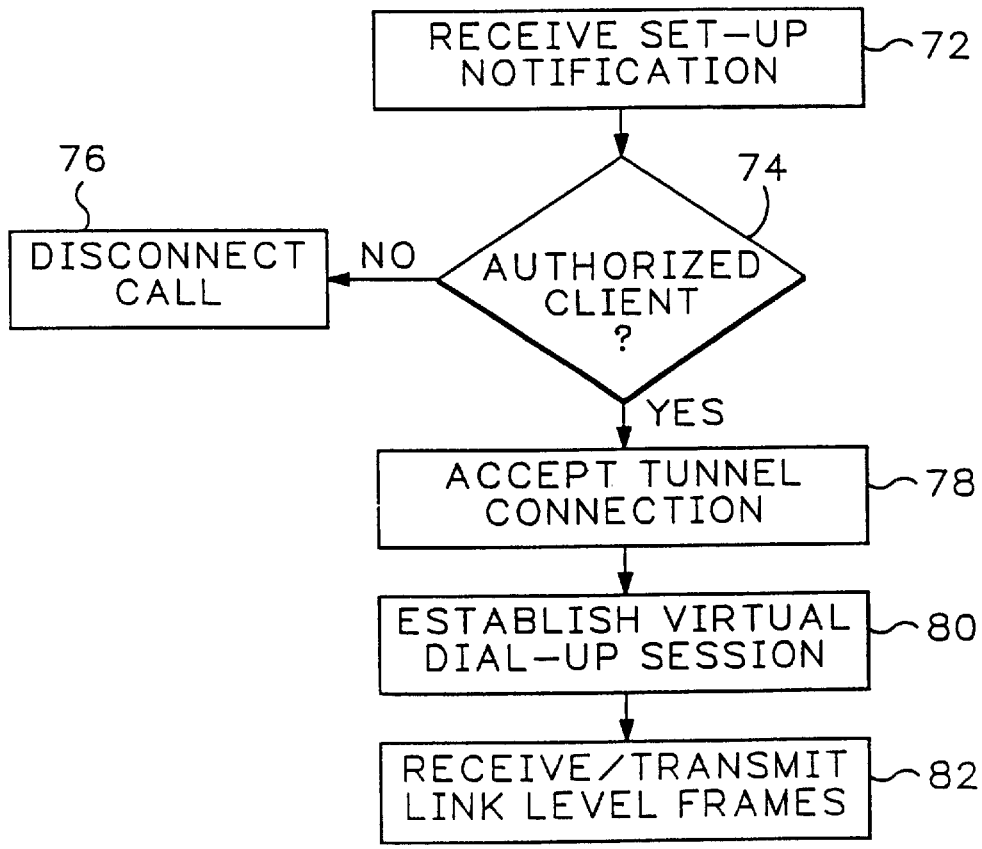
FIG. 6 is a step diagram showing steps performed by a home gateway when establishing the virtual dial-up session.

Referring to FIG. 6, the home gateway 20 receives the set-up notification packet 62 sent from the NAS 27 in step 72. The home gateway 20 conducts remote client authorization in decision step 74. If the client is not in the home gateway 20 local database (FIG. 3), the tunnel slot between NAS 27 and home gateway 20 is disconnected in step 76. If the remote client is validated as an authorized user, home gateway 20 accepts the tunnel connection in step 72. A "virtual interface" is established for SLIP or PPP in step 80. The virtual interface is established in a manner analogous to a direct-dialed connection. With the "virtual interface" in place, link level frames are passed over the tunnel in both directions in step 82.

Figure 7:
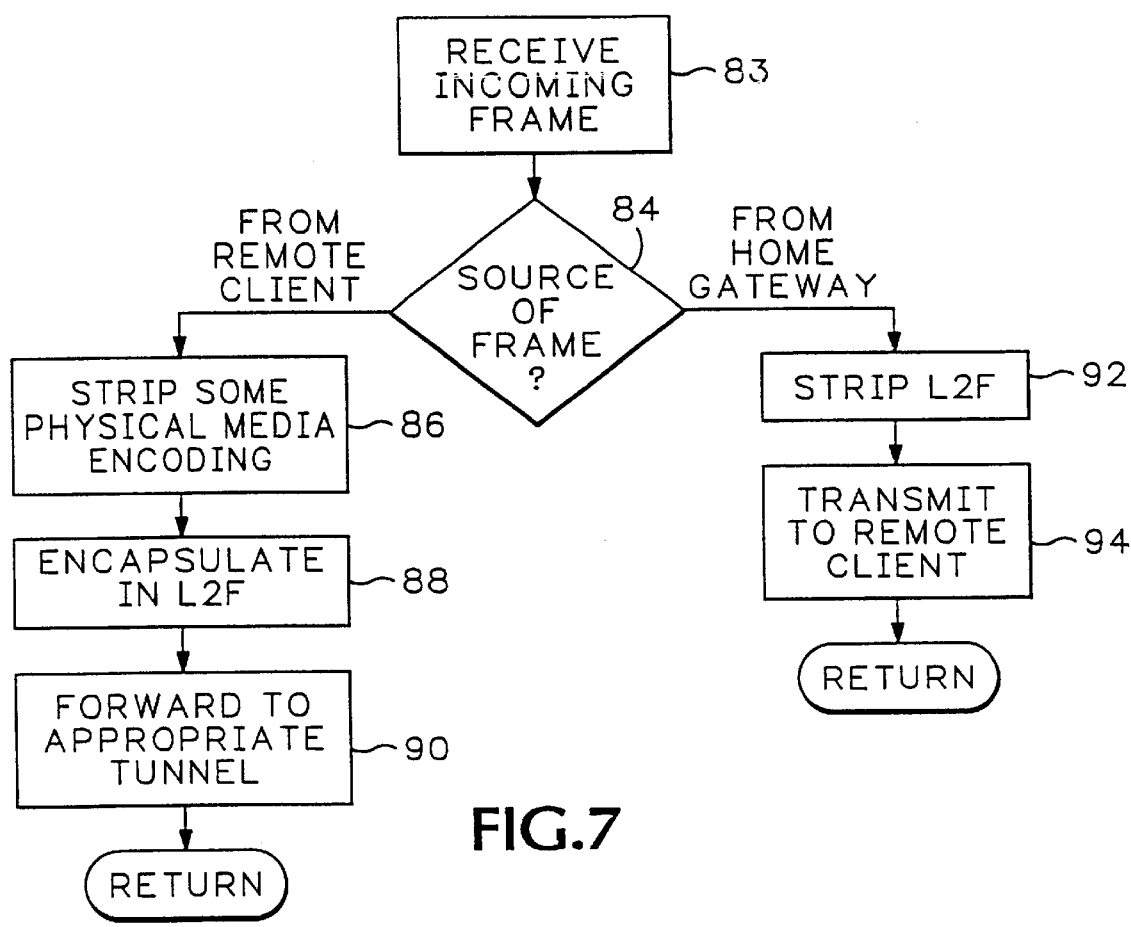
FIG. 7 is a step diagram showing operation of the network access server during the virtual dial-up session.

Referring to FIG. 7, after the virtual dial-up session is established, frames are received at the NAS 27 in step 83. If NAS 27 receives information from remote client 32, the frames are stripped of any link framing or transparency bits or bytes (physical media encoding) in step 86, encapsulated in L2F in step 88, and forwarded over the appropriate tunnel slot to home gateway 20 in step 90. The home gateway 20 accepts these frames, strips L2F, and processes them as normal incoming frames for the appropriate interface and protocol.

The home gateway 20 encapsulates packets sent to NAS 27 in L2F. In step 82, the NAS 27 determines the data is coming from the tunnel slot connected to the home gateway 20. The frame is stripped of L2F in step 92 and transmitted out its physical interface (e.g., modem) to the remote client 32 in step 94.

The connectivity between remote client 32 and home gateway 20 is a point-to-point PPP or SLIP connection whose endpoints are the remote client's networking application on one end and the termination of this connectivity into the home gateway's SLIP or PPP virtual interface on the other end. Because the remote client becomes a direct dial-up client of the home gateway access server, client connectivity can now be managed by the home gateway 20 with respect to further authorization, protocol access, and filtering. Accounting can be performed at both the NAS 27 as well as the home gateway 20.

Because the L2F set-up notification packet 62 for PPP remote clients contain sufficient information for the home gateway 20 to authenticate and initialize an LCP state machine 23, it is not required that the remote client 32 be queried a second time for CHAP authentication, nor that the client undergo multiple rounds of LCP negotiation and convergence. Thus, connection set-up between the remote client 32 and home gateway 20 is optimized and transparent.

Addressing

There are several significant differences between standard internet access service and the virtual dial-up service with respect to authentication, address allocation, authorization and accounting. The mechanisms used for virtual dial-up service coexist with the internet protocol's traditional mechanisms and allow the NAS 27 to simultaneously service standard ISP clients as well as virtual dial-up clients.

For an internet service, an IP address may be allocated to the remote client dynamically from a pool of service provider addresses. Thus, the remote user has little or no access to their home network's resources, due to firewalls and other security policies applied by the home network to accesses from external IP addresses.

For L2F virtual dial-up, the home gateway 20 exists behind the home firewall and allocates addresses which are internal to the home LAN 22, such as non-IP addresses. Because L2F is tunneled exclusively at the frame level, the policies of such address management protocols are irrelevant for correct virtual dial-up service; for all purposes of PPP or SLIP protocol handling, the dial-up user appears to have connected at the home gateway 20.

Remote Client Authentication

The authentication of the remote client occurs in three phases; the first authentication phase occurs at the ISP, and the second and optional third authentication phase occurs at the home gateway 20.

The ISP uses the username to determine that a virtual dial-up service is required and initiates the tunnel connection to the appropriate home gateway 20. Once a tunnel is established, a new multiplex ID is allocated and a session initiated by forwarding the gathered authentication information.

The home gateway 20 undertakes the second phase by deciding whether or not to accept the connection. The connection indication may include CHAP, PAP, or textual authentication information. Based on this information, the home gateway 20 may accept the connection, or may reject it (for instance, it was a PAP request and the username/password are found to be incorrect). Once the connection is accepted, the home gateway 20 is free to pursue a third phase of authentication at the PPP or SLIP level such as proprietary PPP extensions, or textual challenges carried via a TCP/IP telnet session.

Figure 8:
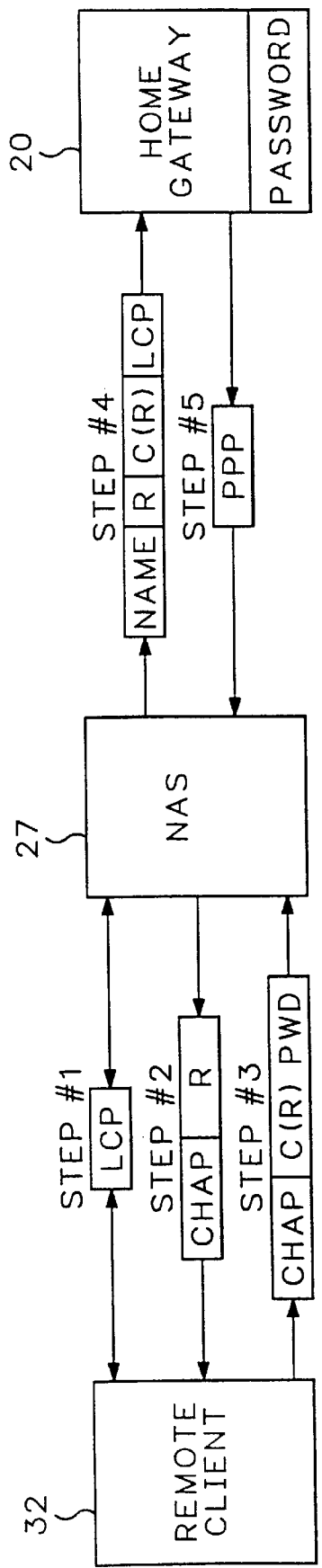
FIG. 8 is a diagram showing the authentication protocol conducted during a forwarding protocol session.

FIG. 8 is a diagram showing the authorization steps conducted while establishing a virtual dial-up session. In step 1, various link level protocols such as LCP are used to initially negotiate bidirectionally between the remote client 32 and the NAS 27. In step 2, a challenge such as CHAP is transmitted from NAS 27 to the remote client 32. During the challenge, the NAS 27 sends a random number (R) to remote client 32.

In step 3, the remote client encrypts the random number R based on a remote client password (pwd). The password is a shared secret between remote client 32 and home gateway 20. The encrypted password cannot be authenticated by the NAS 27. Thus, if the remote client 32 dials up to the wrong location and responds, the dial-up server will not receive any password information that can be used for unauthorized access to the local network. The encryption of R according to the password (C(R)pwd) is conducted using an existing encryption algorithm such as CHAP which is known to those skilled in the art. The remote client name, and the encrypted random number are transmitted back to NAS 27.

In step 4, based on the remote client name, the NAS 32 establishes a tunnel to home gateway 20. The NAS 32 transmits the remote client name, the random number, the encrypted random number C(R)pwd and the LCP session through the tunnel to the home gateway 20. The home gateway 20 then independently encrypts the random number R according to the client password which is prestored in the home gateway database. If the random number encrypted by the home gateway 20 matches the random number encrypted by the remote client 32, a virtual interface is established between the NAS 27 and the home gateway 20. An optional authorization step 5 can be conducted in a PPP session between remote client 32 and home gateway 20.

Accounting

The home gateway 20 can decline a connection based on the authentication information collected by the NAS 27. Accounting can easily draw a distinction between a series of failed connection attempts and a series of brief successful connections. Because authentication is conducted before allowing the tunnel connection, spurious connection costs will be prevented by remote clients failing the authentication session.

Since virtual dial-up is an access service, accounting of connection attempts (in particular, failed connection attempts) is important. The home gateway 20 can accept new connections based on the authentication information gathered by the NAS 27 with corresponding logging. For cases where the home gateway 20 accepts the connection and then continues with further authentication, the home gateway 20 might subsequently disconnect the client. For such scenarios, the disconnection indication back to the NAS 27 may also include a reason.

L2F Protocol Definition

The layer two forwarding protocol (L2F) used during a virtual dial-up session operates as follows.

The NAS 27 and the home gateway 20 each have software that provide a common understanding of the L2F encapsulation protocol so that SLIP/PPP packets can be successfully transmitted and received across the internet 18. The PPP/SLIP packets are encapsulated within L2F. The encapsulated packet is the same packet as it would be transmitted over a physical link. The entire encapsulated packet includes a L2F header, payload packet for SLIP or PPP and an optional Checksum.

Figure 9:
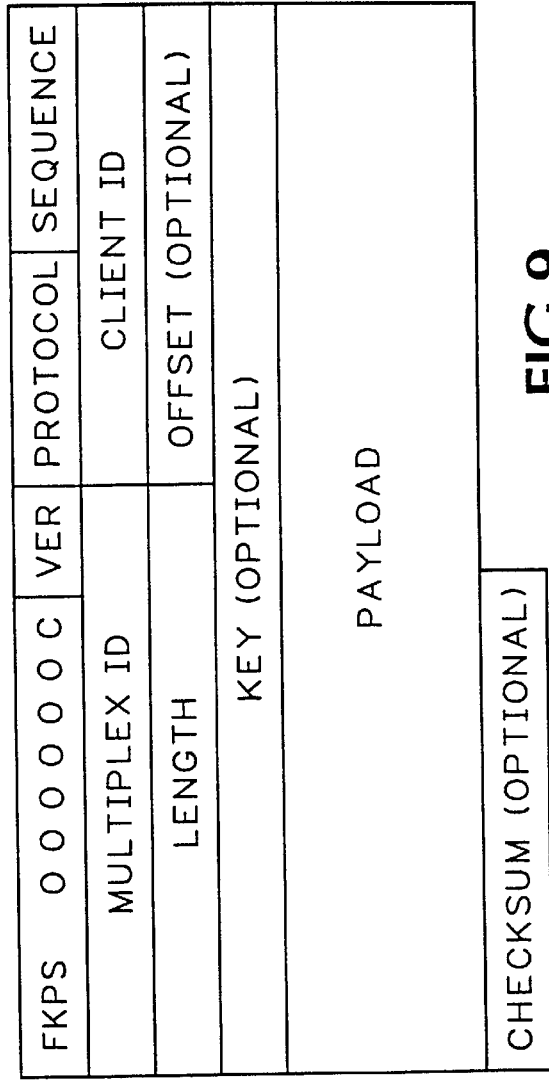
FIG. 9 is a diagram of the data structure for the layer two forwarding protocol.

FIG. 9 is a detailed diagram showing the data structure of the L2F packet.

Version Field

The Ver ("Version") field represents the major version of the L2F software creating the L2F packet.

If any bits are non-zero after bit S, but before bit C, an implementation must discard the packet and initiate disconnect of the entire tunnel. This would correspond to a packet containing extensions not understood by the receiving end. Handling of the "Key" field must be taken in preference to this processing, to avoid denial-of-service attacks. Bit P is used for priority status and bit S is used for sequence numbering.

Protocol Field

The protocol field ("PROTOCOL") specifies the protocol carried within the L2F packet. Legal values (represented here in hexadecimal) are:

| Value | Type | Description |
| --- | --- | --- |
| 0x00 | L2F_ILLEGAL | Illegal |
| 0x01 | L2F_PROTO | L2F management packets |
| 0x02 | L2F_PPP | PPP tunneled inside L2F |
| 0x03 | L2F_SLIP | SLIP tunneled inside L2F |

Sequence Number

The Sequence number starts at 0 for the first L2F packet under a tunnel. Each subsequent packet is sent with the next increment of the sequence number. The sequence number is, thus, a free-running counter represented by modulo 256. For non-L2F management packets, the sequence number is transmitted as 0 and does not increment the local sequence counter, and does not affect the processing of received traffic. For L2F management packets, the sequence number is used to protect against duplication of packets, as follows:

The receiving side of the tunnel records the sequence number of each valid L2F packet it receives. If a received packet appears to have a value less than or equal to the last-received value, the packet must be silently discarded. Otherwise, the packet is accepted and the sequence number in the packet is recorded as the latest value last received.

For purposes of detecting duplication, a received sequence value is considered less than or equal to the last-received value if its value lies in the range of the last value and its 127 successor values. For example, if the last-received sequence number is 15, packets with sequence numbers 0 through 15, as well as 144 through 255, would be considered less than or equal to, and would be silently discarded. Otherwise it would be accepted.

Multiplex ID

The Multiplex ID ("MID") identifies a particular connection within the tunnel. Each new connection is assigned a MID currently unused within the tunnel. The MID cycles through the entire 32-bit namespace, to reduce aliasing between previous and current sessions. The MID with value 0 is special; it is used to communicate the state of the tunnel itself, as distinct from any connection within the tunnel.

Client ID (CLID)

The Client ID is used to assist endpoints in demultiplexing tunnels when the underlying point-to point substrate lacks an efficient or dependable technique for doing so directly. Using CLID, it is possible to demultiplex multiple tunnels whose packets arrive over the point-to-point media interleaved, without requiring media-specific semantics.

When transmitting a L2F_CONF message (described below), a peer's CLID must be communicated via an assigned_CLID field. This must be a unique non-zero value on the sender's side, which is to be expected in all future non-L2F_CONF packets received. The CLID value from the last valid L2F_CONF message received should be recorded and used as the CLID field value for all subsequent packets sent to the peer. Packets with an unknown CLID are silently discarded.

For the initial packet sent during tunnel establishment, where no L2F_CONF has yet been received, the CLID field is 0. Thus, during L2F_CONF, each side is told its CLID value. All later packets sent and tagged with this CLID value, serve as a tag which uniquely identifies this peer.

Length

Length is the size in octets of the entire L2F packet, including header, all fields present, and payload. Length does not reflect the addition of the Checksum, if one is present. The L2F packet is silently discarded if the received packet is shorter than the indicated length. Additional bytes presented in the packet beyond the indicated length are ignored.

Picket Checksum

The Checksum is present if the C bit is present in the header flags. It is a 16-bit CRC as used by PPP/HDLC. It is applied over the entire packet starting with the first byte of the L2F flags, through the last byte of the payload data.

Payload Offset

The Offset is present if the F bit is set in the header flags. This field specifies the number of bytes past the header at which the payload data is expected to start. If it is 0 or if the F bit is not set, the first byte following the last byte of the L2F header is the first byte of payload data.

Packet Key

The Packet Key is the authentication response last given to the peer during tunnel creation. It serves as a key during the life of a session to resist attacks based on spoofing. If a packet is received in which the Key does not match the expected value, the packet is silently discarded.

L2F Tunnel Establishment

When the point-to-point link is first initiated between the NAS 27 and the home gateway 20, the endpoints communicate on MID 0 prior to providing general L2F services to clients. This communication is used to verify the presence of L2F on the remote end, and to permit any needed authentication.

The protocol for such negotiation is always 1, indicating L2F management. The message itself is structured as a sequence of single octets indicating an option, followed by zero or more further octets formatted as needed for the option.

Normal Tunnel Negotiation Sequence

The establishment sequence is illustrated by a "typical" connection sequence. Detailed description of each function follows, along with descriptions of the handling of exceptional conditions.

Each L2F packet is described as a source->destination on one line, a description of the L2F packet field contents on the next, and the contents of the packet's body on following lines. The exact encoding of octets will be described later.

Note that this example uses the Key option, but does not use the Offset and Checksum options. The Length field would be present, reflecting the actual length of the packets as encoded as an octet stream.

1. NAS->GW:
   Proto=L2F, Seq=0, MID=0, CLID=0, Key=0
   L2F_CONF
      Name: NAS_name
      Challenge: RND
   Assigned_CLID: 22

The NAS 27 decides that a tunnel must be initiated from the NAS 27 to the home gateway 20 (GW). An L2F packet is sent with the Protocol field indicating that an L2F management message is contained.

Because the tunnel is being initiated, Key is set to 0. The sequence number starts at 0; the MID is 0 to reflect the establishment of the tunnel itself. Since the NAS 27 has not yet received an L2F_CONF, the CLID is set to 0.

The body of the packet specifies the claimed name of the NAS 27, and a challenge random number (RND) which GW 20 will use in authenticating itself as a valid tunnel endpoint. Assigned_CLID is generated to be a value not currently assigned out to any other tunnel to any other home gateway.

2. GW->NAS:
   Proto=L2F, Seq=0, MID=0, CLID=22, Key=C(Rnd)
   L2F_CONF
      Name: GW_name
      Challenge: Rnd2
      Assigned_CLID: 73

The home gateway 20 has processed the previous packet and sends a response. The protocol continues to be L2F, with a sequence number 0 (each side maintains its own sequence number for transmissions). MID continues to be 0 to reflect tunnel establishment. CLID reflects the Assigned_CLID field of the L2F_CONF received. The Key is a CHAP-style hash of the random number received; each packet hereafter will reflect this calculated value, which serves as a key for the life of the tunnel.

The body contains the name of home gateway 20 and its own random number challenge and its own Assigned_CLID for the NAS 27 to place in the CLID field of future packets. The CLID is generated in an analogous manner to that of the NAS 27. After this, all packets received by GW 20 must be tagged with a CLID field containing 73, and all packets sent to the NAS 27 must be tagged with a CLID field containing 22.

3. NAS->GW
   Proto=L2F, Seq=1, MID=0, CLID=73, Key=C(Rnd2)
   L2F_OPEN

The NAS 27 responds with its Key now set to reflect the shared secret. Like the home gateway 20, the NAS 27 will use this Key for the life of the tunnel.

4. GW->NAS
   Proto=L2F, Seq=1, MID=0, CLID=22, Key=C(Rnd)
      L2F_OPEN

The home gateway 20 provides closure of the key from the NAS 27. The tunnel is now available for clients to be established.

Normal Client Negotiation Sequence

This section describes the establishment of a virtual dial-up client on a NAS 27 into a home gateway 20. It assumes a tunnel has been created in the way described above. The client for this example is a PPP client configured for CHAP.

1. NAS->GW
   Proto=L2F, Seq=2, MID=1, CLID=73, Key=C(Rnd2)
   L2F_OPEN
      Authen: CHAP
      Client: CHAP-name
      Challenge: Rnd3
      Response: <Value received, presumably C(Rnd3)>

The NAS 27 has received a call, tried CHAP with a challenge value of Rnd3, and found that the client responded. The claimed name leads the NAS 27 to believe it was a virtual dial-up client hosted by the home gateway 20. The next free MID is allocated, and the information associated with the CHAP challenge/response is included in the connect notification.

2. GW->NAS
   Proto=L2F, Seq=2, MID=1, CLID=22, Key=C(Rnd)
   L2F_OPEN
   The home gateway 20, by sending back the L2F_OPEN, accepts the client.
3. NAS->GW
   Proto=PPP, Seq=0, MID=1, CLID=73, Key=C(Rnd2)
   <Frame follows>
4. GW->NAS
   Proto=PPP, Seq=0, MID=1, CLID=22, Key=C(Rnd)
   <Frame follows>

Traffic is now free to flow in either direction as sent by the remote client 27 or any home site on LAN 22 (FIG. 2). The contents of the L2F frames is uninterpreted data such as High Level Data Link Control (HDLC). Data traffic, since it is not the L2F protocol, does not use the Seq field, which is set to 0 in non-L2F messages.

L2F Management Message Types

When a L2F packet's Proto field specifies L2F management, the body of the packet is encoded as zero or more options. An option is a single octet "message type", followed by zero or more sub-options.

Each sub-option is a single byte sub-option value, and further bytes as appropriate for the sub-option.

Options in L2F are:

| Hex Value | Abbreviation | Description |
| --- | --- | --- |
| 0x00 | Invalid | Invalid message |
| 0x01 | L2F_CONF | Request configuration |
| 0x01 | L2F_CONF_TYPE | Type of authentication used |
| 0x02 | L2F_CONF_NAME | Name of peer sending L2F_CONF |
| 0x03 | L2F_CONF_CHAL | Random # peer challenges with |
| 0x04 | L2F_CONF_CLID | Assigned_CLID for peer to use |
| 0x02 | L2F_OPEN | Accept configuration |
| 0x01 | L2F_OPEN_CHAP | CHAP name received from client |
| 0x02 | L2F_OPEN_CHAL | Challenge CHAP client received |
| 0x03 | L2F_OPEN_RESP | CHAP challenge response from client |
| 0x04 | L2F_ACK_LCP1 | LCP CONFACK accepted from client |
| 0x05 | L2F_ACK_LCP2 | LCP CONFACK sent to client |
| 0x03 | L2F_CLOSE | Request disconnect |
| 0x01 | L2F_CLOSE_WHY | Reason code for close |
| 0x02 | L2F_CLOSE_STR | ASCII string description |
| 0x04 | L2F_ECHO | Verify presence of peer |
| 0x05 | L2F_ECHO_RESP | Respond to L2F_ECHO |

L2F Message Type: Invalid

If a message is received with this value, or any value higher than the last recognized option value, the packet is considered invalid. The packet is discarded, and a L2F_CLOSE of the entire tunnel is requested. Upon receipt of a L2F_CLOSE, the tunnel itself may be closed. All other received messages are discarded. An implementation may also close the tunnel after an interval of time appropriate to the characteristics of the tunnel. Invalid sub-option values, even if present under a valid option, are treated as if the entire message type was invalid.

L2F_CONF

The L2F message type is used to establish the tunnel between the NAS 27 and the home gateway 20. MID is always set to 0. The body of such a message starts with the octet 0x01 (L2F_CONF), followed by one or more sub-options.

The L2F_CONF_TYPE sub-option must be present. It is encoded as the octet 0x01, followed by a single byte describing the type of authentication the NAS 27 exchanged with the remote client 32 in detecting the client's claimed identification. The authentication types are:

0x01 Textual username/password exchange
0x02 PPP CHAP
0x03 PPP PAP

The L2F_CONF_NAME sub-option must be present. It is encoded as the octet value 0x02, followed by an octet specifying a non-zero length, followed by the indicated number of bytes, which are interpreted as the sender's ASCII name.

The L2F_CONF_CHAL sub-option must be present. It is encoded as the octet value 0x03, followed by four bytes of challenge value. The challenge value is generated using a random number generator.

The L2F_CONF_CLID sub-option must be present. It is encoded as the octet 0x04, followed by four bytes of Assigned_CLID value. The Assigned_CLID value is generated as a non-zero value unique across all tunnels which exist on the sending system.

The CLID field is sent as 0 when a L2F_CONF packet is received from the peer. After this, the Assigned$_{13}$ CLID value of the last L2F_CONF packet received must be placed in the CLID of all packets being sent. When sent from a NAS to a home gateway, the L2F_CONF is the initial packet in the conversation. Key is set to 0, since no challenge has been received yet.

When sent from the home gateway 20 to the NAS 27, a L2F_CONF indicates the home gateways recognition of the tunnel creation request. The home gateway 20 must provide its name and its own challenge in the message body. Key must be set to the CHAP-style hash of the received challenge bytes.

L2F_OPEN

The L2F_OPEN message is used to establish a client connection within a tunnel previously established by L2F_CONF messages. When sent from the NAS 27 to the home gateway 20, it is used to indicate the presence of a new dial-up client. When sent back from the home gateway 20 to the NAS 27, it indicates acceptance of the client. This message starts with the octet 0x02. When sent from the NAS 27, it may contain further sub-options. When sent from the home gateway 20, it may not contain any options.

The L2F_OPEN_CHAP sub-option is encoded as the octet 0x01, followed by an octet specifying the length of the CHAP name received, followed by the indicated number of bytes of CHAP name.

The L2F_OPEN_CHAL sub-option is encoded as the octet 0x02, followed by an octet specifying the length of the CHAP challenge sent, followed by the CHAP challenge itself.

The L2F_OPEN_RESP sub-option is encoded as the octet 0x03, followed by an octet specifying the length of the CHAP response sent, followed by the client's response to the CHAP challenge. This message must be treated as invalid if L2F_OPEN_CHAP, L2F_OPEN_CHAL, and L2F_OPEN_RESP do not all appear within the same message.

The L2F_ACK_LCP1 and L2F_ACK_LCP2 sub-options are encoded as the octets 0x04 and 0x05 respectively, followed in either case by two octets in network byte order specifying the length of the LCP CONFACK last received from or sent to the client. Following these octets is an exact copy of the CONFACK packet.

The home gateway 20 may choose to ignore any sub-option of the L2F_OPEN and accept the connection anyway. The home gateway 20 would then have to undertake its own LCP negotiations and authentication.

L2F_CLOSE

This message is encoded as the byte 0x03. An L2F_CLOSE may be sent by either side of the tunnel at any time.

When sent with MID of 0, it indicates the desire to terminate the entire tunnel and all clients within the tunnel. When sent from the home gateway 20 in response to an L2F_OPEN, it indicates that the home gateway 20 has declined the connection. When sent with a non-zero MID, it indicates the termination of that client within the tunnel.

The L2F_CLOSE_WHY sub-option is encoded as the byte 0x01 followed by four bytes in network byte order specifying a bit mask of reasons for the disconnection. The bits are encoded as:

0x00000001 Authentication failed
0x00000002 Out of resources
0x00000004 Administrative intervention
0x00000008 User quota exceeded
0x00000010 Protocol error
0x00000020 Unknown user
0x00000040 Incorrect password
0x00000080 PPP configuration incompatible Bits in the mark 0xFF000000 are reserved for per-vendor interpretation.

An implementation can choose to not provide status bits even if it detects a condition described by one of these bits. For instance, an implementation may choose to not use 0x00000020 due to security considerations, as it can be used to prove user name space.

The L2F_CLOSE_STR sub-option is encoded as the byte 0x02, followed by a two-byte length in network byte order, followed by the indicated number of bytes, which are interpreted as descriptive ASCII text associated with the disconnection. This string may be ignored, but could be recorded in a log to provide detailed or auxiliary information associated with the L2F_CLOSE.

L2F_ECHO

Transmission of L2F_ECHO messages are optional. If an implementation transmits L2F_ECHO messages, it must not transmit more than one such request each second. The payload size must be 64 bytes or less in length.

The L2F_ECHO message is encoded as the single byte 0x04. It can be sent by either side once the tunnel is established. MID must be 0. An L2F_ECHO_RESP must be sent back in response.

L2F_ECHO_RESP

All implementations respond to L2F_ECHO, using L2F_ECHO_RESP. The received packet is sent back verbatim, except that the CLID, sequence number, and Checksum (if any) must be updated, and the L2F_ECHO message type changed to an L2F_ECHO_RESP. Payload data following the 0x04 octet, if any, must be preserved in the response.

When an L2F_ECHO_RESP is received, the payload data may be used to associate this response with a previously sent L2F_ECHO, or the packet may be silently discarded.

L2F Message Delivery

L2F is designed to operate over point-to-point unreliable links. It is not designed to provide flow control of the data traffic, nor does it provide reliable delivery of this traffic; each protocol tunnel via L2F is expected to manage flow control and retry itself. Thus, it is only L2F control messages which must be retransmitted; this process is described in this section.

Sequenced Delivery

All L2F control messages (i.e., those L2F packets with a protocol type of 0x01) are transmitted with a sequence number. The sequence number is a per-L2F tunnel free-running counter which is incremented (modulo 256) after each packet is transmitted. It is used to permit the receiving end to detect duplicated or out-of-order packets, and to discard such packets.

Because L2F in operation carries uninterpreted frames, it permits operation of features without explicit knowledge of these features. For instance, if a PPP session is carried, L2F is simply transporting HDLC frames. The two PPP endpoints can negotiate higher-level features, such as reliable link, compression, multi-link, or encryption.

These features then operate between the two PPP endpoints (the dial-up client on one end, and the home gateway 20 on the other), with L2F continuing to simply ship HDLC frames back and forth. For similar reasons, PPP echo requests, NCP configuration negotiation, and even termination requests, are all simply tunneled HDLC frames.

Termination

As L2F simply tunnels link-level frames, it does not detect frames like PPP TERMREQ. L2F termination in these scenarios is driven from a protocol endpoint; for instance, if a home gateway 20 receives a TERMREQ, its action will be to "hang up" the PPP session. The L2F implementation at the home gateway 20 converts a "hang up" into a L2F_CLOSE action, which will shut down the client's session in the tunnel cleanly. L2F_CLOSE_WHY and L2F_CLOSE_STR may be included to describe the reason for the shut-down.

Extended Authentication

L2F is compatible with both PAP and CHAP protocols. SLIP does not provide authentication within the protocol itself, and thus requires an ASCII exchange of username and password before SLIP is started. L2F is compatible with this mode of operation as well.

To the extent the NAS 27 can capture and forward the one-time password, L2F operation is compatible with password cards. For the most general solution, an arbitrary request/response exchange is supported. In a L2F environment, the protocol is structured so that the NAS 27 can detect the apparent identity of the user and establish a tunnel connection to the home gateway 20, where the arbitrary exchange can occur.

The home gateway 20 requires authentication before accepting a connection from NAS 14. Thus, there will not be a spurious run-up of line toll charges since the remote client does not first connect to the private system and then provide an appropriate PPP authentication protocol (e.g., CHAP).

It should also be apparent that many of the L2F operations conducted by NAS 27 could be alternative performed in the remote client 32. For example, the random number generation, encryption and transmission could be conducted solely by the remote client without interaction by the NAS 27. Also tunneling negotiations and L2F encapsulation could similarly be conducted in the remote client instead of the NAS 27.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A method for establishing a network session, comprising:

establishing a point-to-point session with a remote client; and projecting the point-to-point session to a local network using a data link layer projection scheme for creating a virtual point-to-point session between the remote client and the local network.

2. A method according to claim 1 including:
transmitting an authentication request to the remote client;
receiving a keyed random number from the remote client;
transmitting the keyed random number to the local network; and
creating the virtual point-to-point session when the keyed random number is authenticated by the local network.

3. A method according to claim 2 including using a Challenge Authentication Protocol (CHAP) or Password Authentication Protocol (PAP) for obtaining the keyed random number.

4. A method according to claim 1 including using a Point-to-Point Protocol (PPP) or a Serial Line Interface Protocol (SLIP) for the point-to-point session.

5. A method according to claim 1 including forwarding a Link Control Protocol (LCP) point-to-point session to the local network using the data link layer projection scheme.

6. A method according to claim 1 including connecting to the local network through a public switched telephone network access or an integrated services digital network access.

7. A method according to claim 1 including:
encapsulating the point-to-point session with a data link layer protocol;
forwarding the encapsulated point-to-point session to the local network so that the encapsulated point-to-point session operates as a direct point-to-point connection between the remote client and the local network.

8. A method according to claim 7 including identifying virtual dial-up clients among different remote clients and conducting the encapsulation and forwarding only for the identified virtual dial-up clients.

9. Computer code stored on a computer readable medium for establishing a network session, comprising:
code for establishing a point-to-point session with a remote client; and
code for projecting the point-to-point session to a local network using a data link layer projection scheme for creating a virtual point-to-point session between the remote client and the local network.

10. Computer code according to claim 9 including:
code for transmitting an authentication request to the remote client;
code for receiving a keyed random number from the remote client;
code for transmitting the keyed random number to the local network; and
code for creating the virtual point-to-point session when the keyed random number is authenticated by the local network.

11. Computer code according to claim 10 including code for using a Challenge Authentication Protocol (CHAP) or Password Authentication Protocol (PAP) for obtaining the keyed random number.

12. Computer code according to claim 9 including code for using a Point-to-Point Protocol (PPP) or a Serial Line Interface Protocol (SLIP) for the point-to-point session.

13. Compute code according to claim 9 including code for forwarding a Link Control Protocol (LCP) point-to-point session to the local network using the data link layer projection scheme.

14. Computer code according to claim 9 including code for connecting to the local network through a public switched telephone network access or an integrated services digital network access.

15. Computer code according to claim 9 including:
code for encapsulating the point-to-point session with a data link layer protocol; and
code for forwarding the encapsulated point-to-point session to the local network so that the encapsulated point-to-point session operates as a direct point-to-point connection between the remote client and the local network.

16. Computer code according to claim 15 including code for identifying virtual dial-up clients among different remote clients and conducting the encapsulation and forwarding only for the identified virtual dial-up clients.

17. A system for establishing a network session, comprising:
means for establishing a point-to-point session with a remote client; and
means for projecting the point-to-point session to a local network using a data link layer projection scheme for creating a virtual point-to-point session between the remote client and the local network.

18. A system according to claim 17 including:
means for transmitting an authentication request to the remote client;
means for receiving a keyed random number from the remote client;
means for transmitting the keyed random number to the local network; and
means for creating the virtual point-to-point session when the keyed random number is authenticated by the local network.

19. A system according to claim 18 including means for using a Challenge Authentication Protocol (CHAP) or Password Authentication Protocol (PAP) for obtaining the keyed random number.

20. A system according to claim 17 including means for using a Point-to-Point Protocol (PPP) or a Serial Line Interface Protocol (SLIP) for the point-to-point session.

21. A system according to claim 17 including means for forwarding a Link Control Protocol (LCP) point-to-point session to the local network using the data link layer projection scheme.

22. A system according to claim 17 including means for connecting to the local network through a public switched telephone network access or an integrated services digital network access.

23. A system according to claim 17 including:
means for encapsulating the point-to-point session with a data link layer protocol; and
means for forwarding the encapsulated point-to-point session to the local network so that the encapsulated point-to-point session operates as a direct point-to-point connection between the remote client and the local network.

24. A system according to claim 23 including means for identifying virtual dial-up clients among different remote clients and conducting the encapsulation and forwarding only for the identified virtual dial-up clients.

25. A method for remotely accessing a local network, comprising:
identifying a remote client having authorized access to a local network using a data link layer protocol;
establishing a connection to the local network for authorized remote client; and
conducting a virtual point-to-point session with the authorized remote client and the local network using the data link layer protocol.

26. A method according to claim 25 including:
   receiving a remote client name, a random number and an encrypted random number for the remote client;
   locally encrypting the random number using a stored password corresponding to the remote client name; and
   establishing the virtual point-to-point session when the received encrypted random number matches the locally encrypted random number.

27. A method according to claim 25 including receiving the virtual point-to-point session encapsulated in the data link layer protocol.

28. A method according to claim 25 including receiving a multiplex identification field for multiplexing multiple virtual point-to-point sessions using the data link layer forwarding protocol at the same time.

29. A method according to claim 28 including receiving a client ID field for demultiplexing multiple virtual point-to-point sessions.

30. A method according to claim 25 including receiving a packet key in a data link level protocol header for encrypting authentication responses.

31. Computer code stored on a computer readable medium for remotely accessing a local network, comprising:
   code for identifying a remote client having authorized access to a local network using a data link layer protocol;
   code for establishing a connection to the local network for authorized remote client; and
   code for conducting a virtual point-to-point session with the authorized remote client and the local network using the data link layer protocol.

32. Computer code according to claim 31 including:
   code for receiving a remote client name, a random number and an encrypted random number for the remote client;
   code for locally encrypting the random number using a stored password corresponding to the remote client name; and
   code for establishing the virtual point-to-point session when the received encrypted random number matches the locally encrypted random number.

33. Computer code according to claim 31 including code for receiving the virtual point-to-point session encapsulated in the data link layer protocol.

34. Computer code according to claim 31 including code for receiving a multiplex identification field for multiplexing multiple virtual point-to-point sessions using the data link layer forwarding protocol at the same time.

35. Computer code according to claim 34 including code for receiving a client ID field for demultiplexing multiple virtual point-to-point sessions.

36. Computer code according to claim 31 including code for receiving a packet key in a data link level protocol header for encrypting authentication responses.

37. A system for remotely accessing a local network, comprising:
   means for identifying a remote client having authorized access to a local network using a data link layer protocol;
   means for establishing a connection to the local network for authorized remote client; and
   means for conducting a virtual point-to-point session with the authorized remote client and the local network using the data link layer protocol.

38. A system according to claim 37 including:
   means for receiving a remote client name, a random number and an encrypted random number for the remote client;
   means for locally encrypting the random number using a stored password corresponding to the remote client name; and
   means for establishing the virtual point-to-point session when the received encrypted random number matches the locally encrypted random number.

39. A system according to claim 37 including means for receiving the virtual point-to-point session encapsulated in the data link layer protocol.

40. A system according to claim 37 including means for receiving a multiplex identification field for multiplexing multiple virtual point-to-point sessions using the data link layer forwarding protocol at the same time.

41. A system according to claim 40 including means for receiving a client ID field for demultiplexing multiple virtual point-to-point sessions.

42. A system according to claim 37 including code for receiving a packet key in a data link level protocol header for encrypting authentication responses.

43. A computer, comprising:
   a first interface configured to receive a point-to-point session transported over a data link layer forwarding protocol;
   a second interface configured to communicate with a local network; and
   a processor configured to establish the point-to-point session between a remote client and the local network according to the data link layer forwarding protocol.

44. A computer according to claim 43 wherein the data link layer forwarding protocol encapsulates the point-to-point session in a data link layer header.

45. A computer according to claim 43 wherein the processor authenticates the remote client using the data link layer forwarding protocol.

46. A computer according to claim 45 wherein the authentication comprises encrypting a random number according to a prestored remote client password and comparing the encrypted random number with an encrypted random number received over the data link layer forwarding protocol.

47. A computer according to claim 43 wherein the processor conducts an accounting for the direct point-to-point link session.

48. A computer, comprising:
   a first interface conducting a point-to-point session with a remote client;
   a second interface connected to an internet infrastructure; and
   a processor configured for projecting the point-to-point session through the internet infrastructure to a local network using a forwarding protocol operating at a data link layer.

49. A computer according to claim 48 wherein the processor attaches a forwarding protocol header to the point-to-point session.

50. A computer according to claim 49 wherein the processor establishes a tunnel through the internet infrastructure to the local network and transmits the point-to-point session through the tunnel.

* * * * *

UNITED STATES PATENT AND TRADEMARK OFFICE
CERTIFICATE OF CORRECTION

PATENT NO.    : 6,487,598 B1
DATED         : November 26, 2002
INVENTOR(S)   : Valencia It is certified that error appears in the above-identified patent and that said Letters Patent is hereby corrected as shown below:

Column 1,
Lines 6 and 7, "issued Oct. 23, 2001 which claims the benefit of U.S. patent application Ser. No. 08/687,973 filed Jul. 29, 1996," should read -- issued Oct. 23, 2001 which is a continuation of U.S. patent application Ser. No. 08/687,973 filed Jul. 29, 1996, --.

Signed and Sealed this

Twenty-first Day of June, 2005

JON W. DUDAS
*Director of the United States Patent and Trademark Office*